March 24, 1959 J. H. SELBY 2,878,528
APPARATUS FOR PROCESSING SLIVERS
Filed April 7, 1955 5 Sheets-Sheet 1

INVENTOR.
JACK H. SELBY
BY Hudson, Boughton,
Williams, David & Hoffman
ATTORNEYS

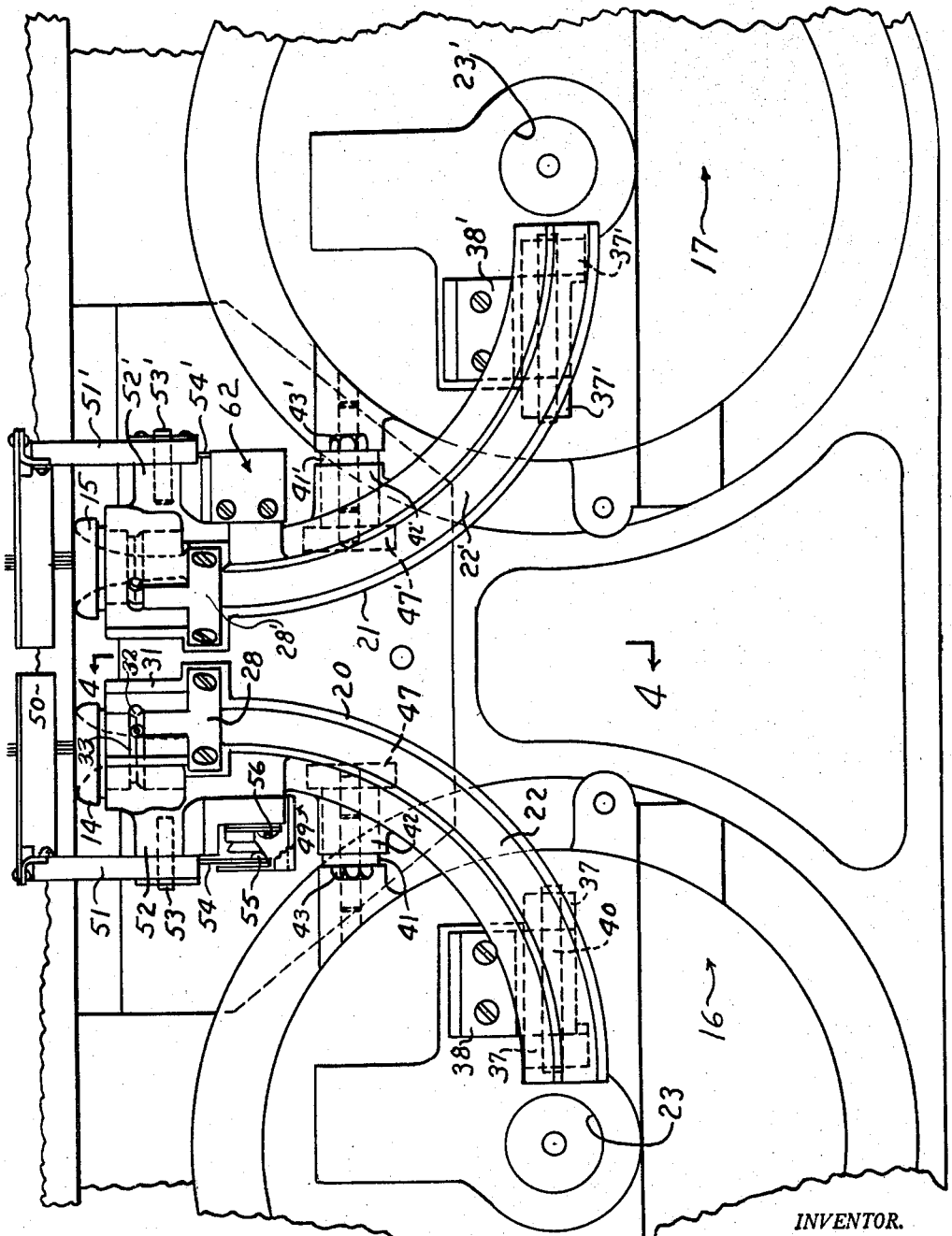

March 24, 1959 J. H. SELBY 2,878,528
APPARATUS FOR PROCESSING SLIVERS
Filed April 7, 1955 5 Sheets-Sheet 3

INVENTOR.
JACK H. SELBY
BY Hudson, Boughton,
Williams, David & Hoffman
ATTORNEYS

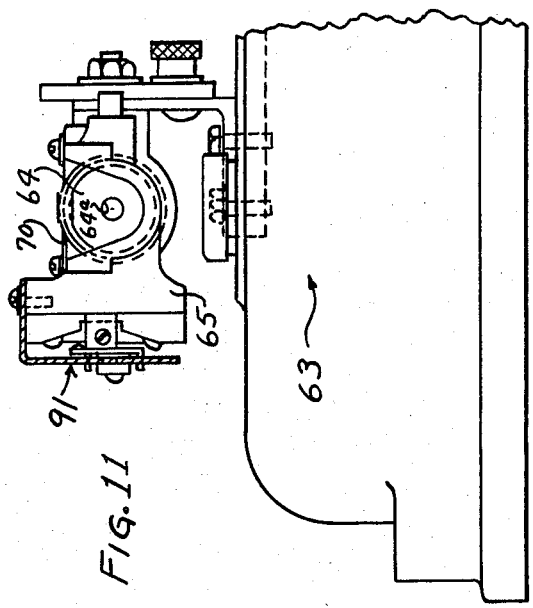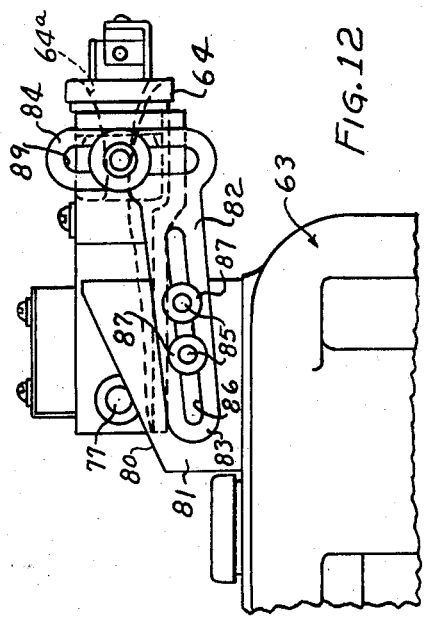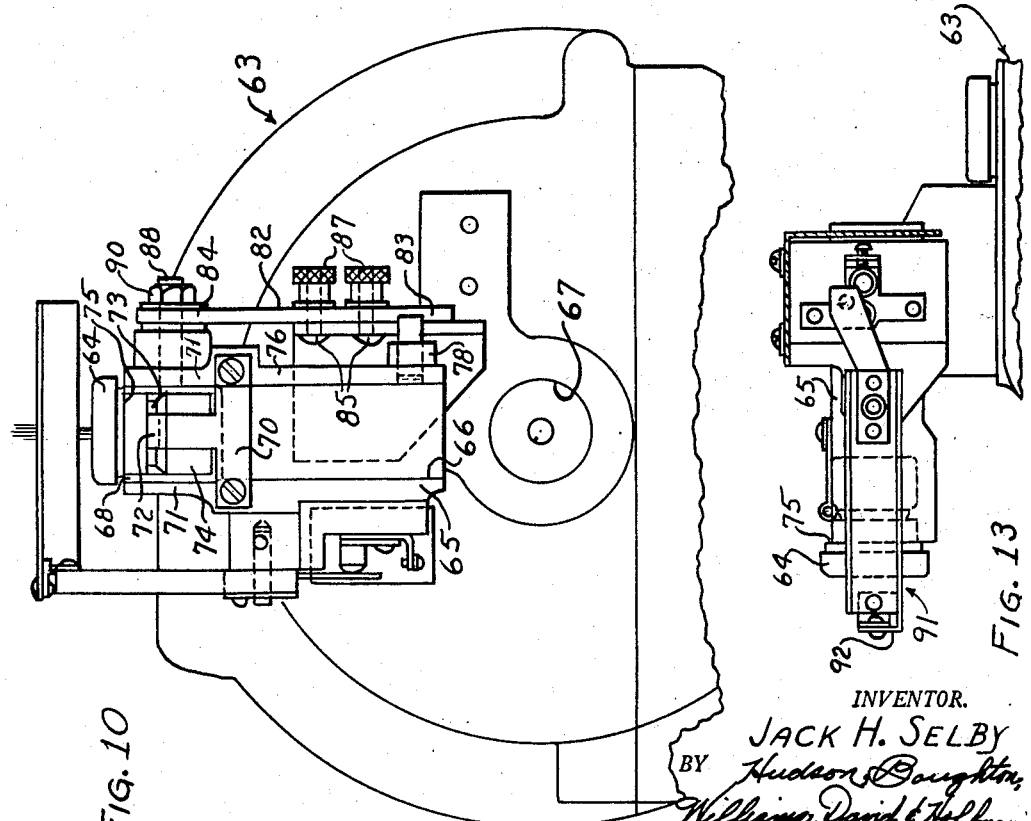

March 24, 1959          J. H. SELBY          2,878,528

APPARATUS FOR PROCESSING SLIVERS

Filed April 7, 1955          5 Sheets-Sheet 5

INVENTOR.
JACK H. SELBY
BY Hudson, Boughton,
Williams, David & Hoffmann
ATTORNEYS

United States Patent Office 2,878,528
Patented Mar. 24, 1959

2,878,528
APPARATUS FOR PROCESSING SLIVERS

Jack H. Selby, Twinsburg, Ohio, assignor to The Warner & Swasey Company, Cleveland, Ohio, a corporation of Ohio Application April 7, 1955, Serial No. 499,859

12 Claims. (Cl. 19—165)

The present invention relates to an apparatus for processing slivers, and more particularly, to trumpets for condensing web-like fibers and a guide for the condensed fiber, the condensing trumpet and guide preferably having in combination therewith stop motion mechanism for stopping the apparatus when the sliver bunches or breaks.

An important object of the present invention is the provision of a new and improved apparatus for processing slivers in which a condensing trumpet is provided for compacting a web-like sliver and in which an open chute or guideway is provided for guiding the movement of the compacted or condensed sliver from the condensing trumpet to a mechanism, for example, a coiling head, for performing an additional operation on the sliver, the trumpet and guideway preferably having in combination therewith stop motion mechanism responsive to the thickness of the sliver at the mouth of the trumpet for stopping the apparatus to interrupt the movement of the sliver when the latter either bunches or breaks.

Another object of the present invention is to provide a new and improved apparatus for processing slivers in which a condensing trumpet for compacting a web-like sliver is positioned to control the manner in which the sliver is compacted and to control the direction of curl of the sliver as it passes through the trumpet and in which a guide member for the compacted sliver is movable with the trumpet so as to always be in position to receive the compacted sliver from the trumpet.

Another object of the present invention is to provide a new and improved sliver condensing trumpet and guide member which is readily positionable to facilitate the use of the trumpet with web-like slivers of various widths and with different length fibers and which is also positionable with respect to the line of movement of the sliver to control the manner in which the sliver curls as it passes through the trumpet.

Another object of the present invention is to provide a new and improved sliver processing apparatus in which a pair of condensing trumpets and guides are provided to receive and condense different web-like slivers from cooperating drafting rolls, for example, the drafting rolls on a gill box and guide the condensed slivers to a coiling mechanism offset from the axis of the respective trumpets and in which the trumpets preferably may be selectively positioned so that the sliver engages with either one of oppositely disposed portions of the mouth of the trumpet.

Another object of the present invention is to provide a new and improved sliver processing apparatus including a condensing trumpet and a guide for the compacted sliver exiting from the trumpet, the condensing trumpet detachably connected to the entrance end of the guide by a spring clip mechanism.

The present invention resides in certain constructions and arrangements and combination of parts, and further objects and advantages will be apparent from the following detailed description thereof taken in conjunction with the accompanying drawings, in which:

Fig. 3 is a fragmentary plan view of the apparatus of Fig. 1.

Fig. 10 is an enlarged fragmentary plan view of the apparatus of Fig. 9.

Fig. 11 is an enlarged fragmentary elevational view of the apparatus shown in Fig. 9 illustrating in detail the condensing trumpet, guide and stop motion mechanism.

Fig. 12 is a side elevational view looking at the right hand side of the apparatus of Fig. 10.

Fig. 13 is a side elevational view looking at the left hand side of the apparatus of Fig. 10.

Figure 1:
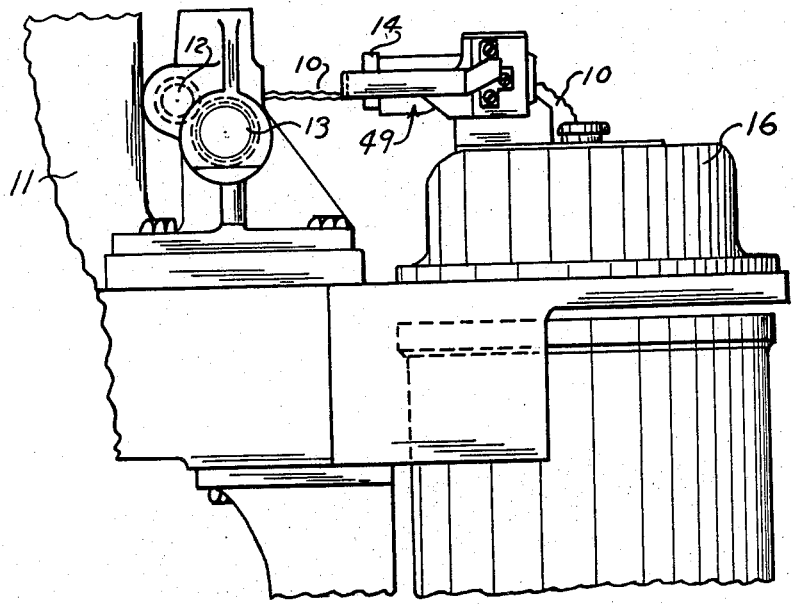
Fig. 1 is a fragmentary side elevational view of a gill box and coiling head embodying the present invention.
Figure 2:
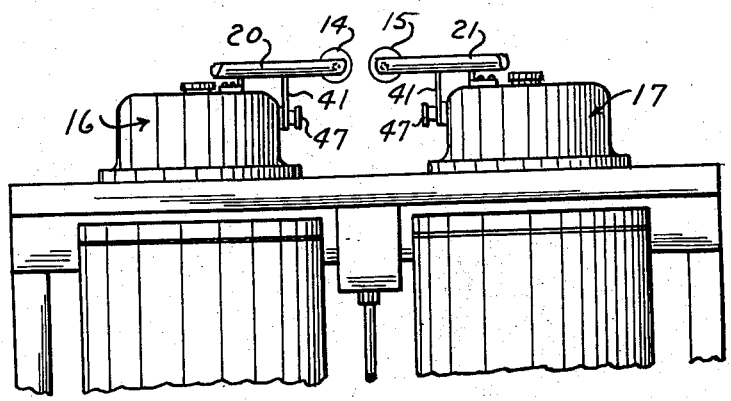
Fig. 2 is a fragmentary elevational view looking at the right hand side of the apparatus of Fig. 1.
Figure 9:
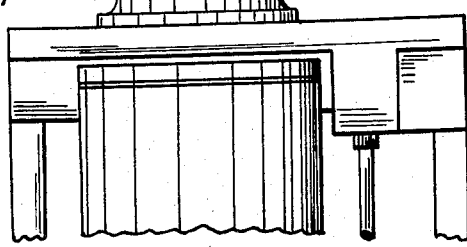
Fig. 9 is an end elevational view of a single trumpet and coiling head for receiving, compacting and coiling a web-like sliver.
Figure 5:
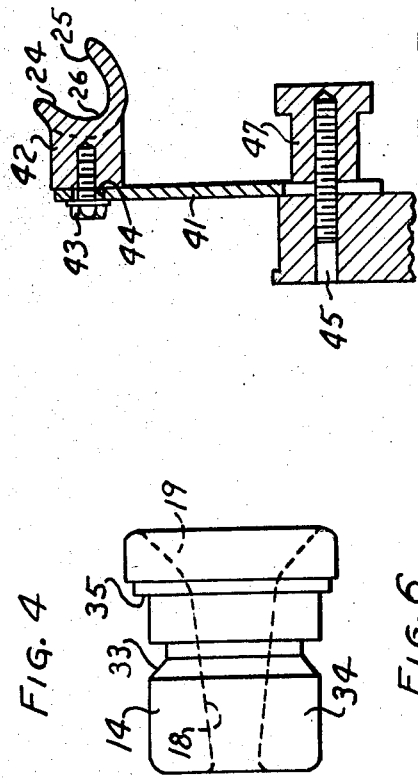
Fig. 5 is a sectional view taken approximately along line 5—5 of Fig. 4.
Figure 4:
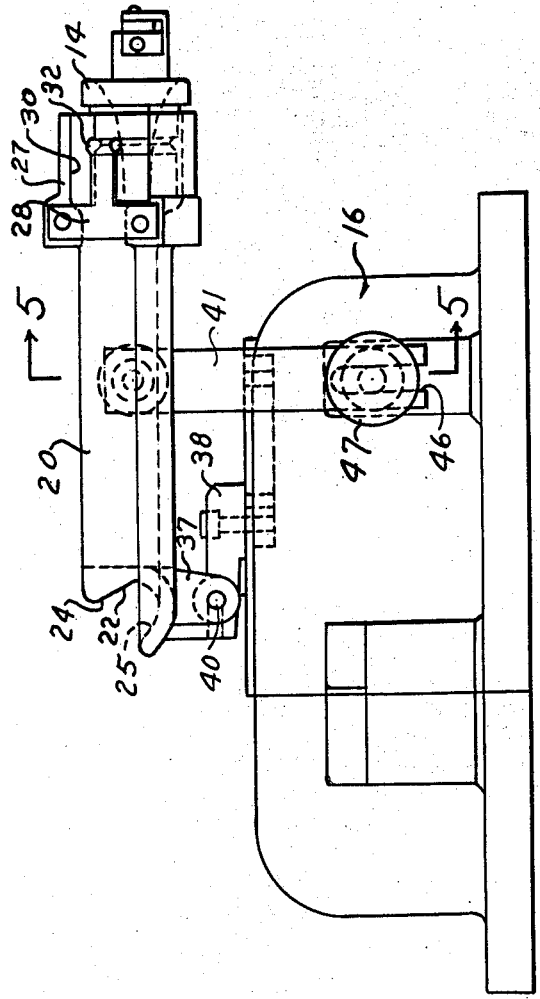
Fig. 4 is a detached elevational view looking approximately along line 4—4 of Fig. 3.
Figure 6:
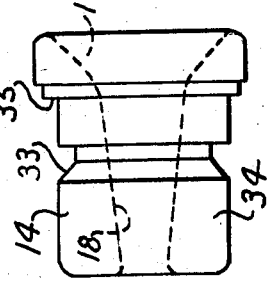
Fig. 6 is a detached elevational view showing the trumpet used with the illustrated apparatus.
Figure 8:
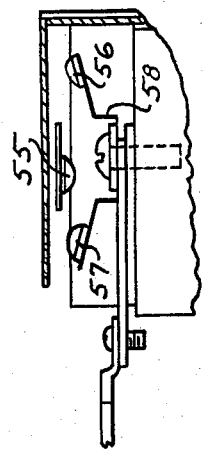
Fig. 8 is a fragmentary view looking at the lower end of the stop motion mechanism as viewed in Fig. 7.
Figure 7:
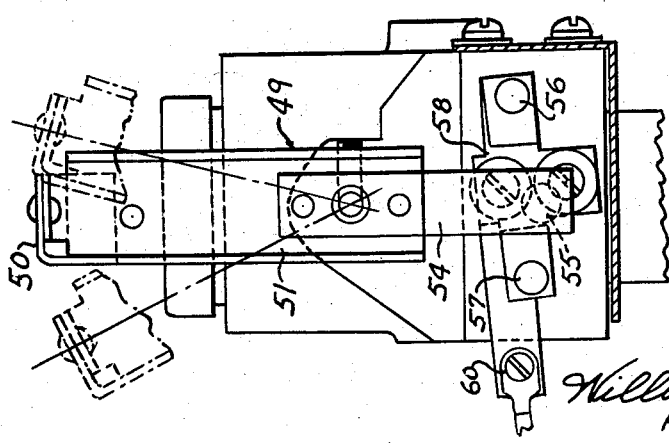
Fig. 7 is a side elevational view with parts thereof cut away, showing the stop motion mechanism.
Figure 14:
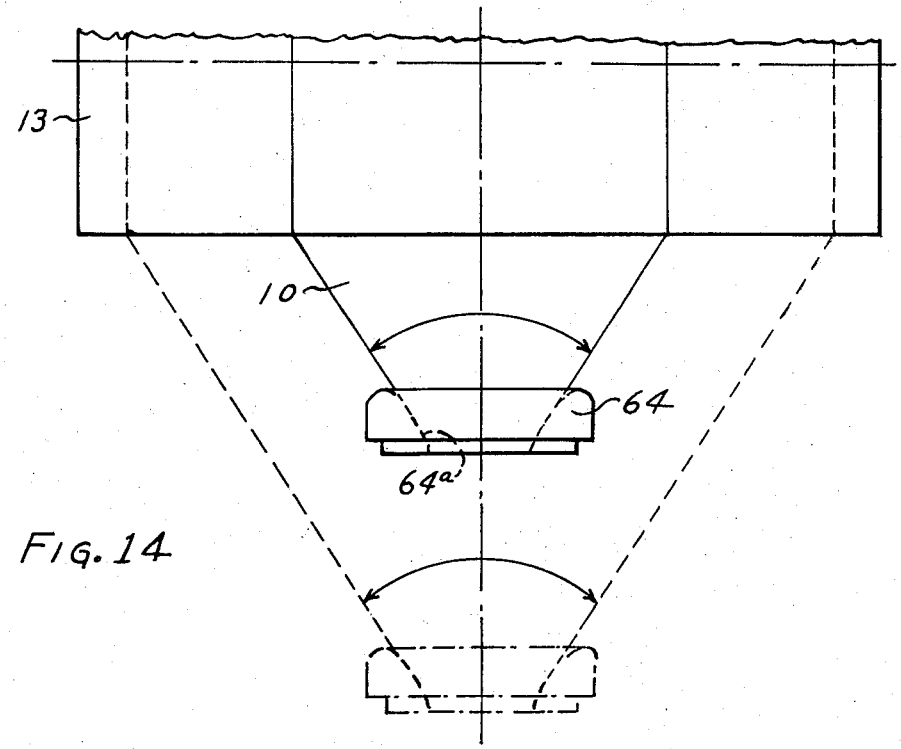
Figure 15:
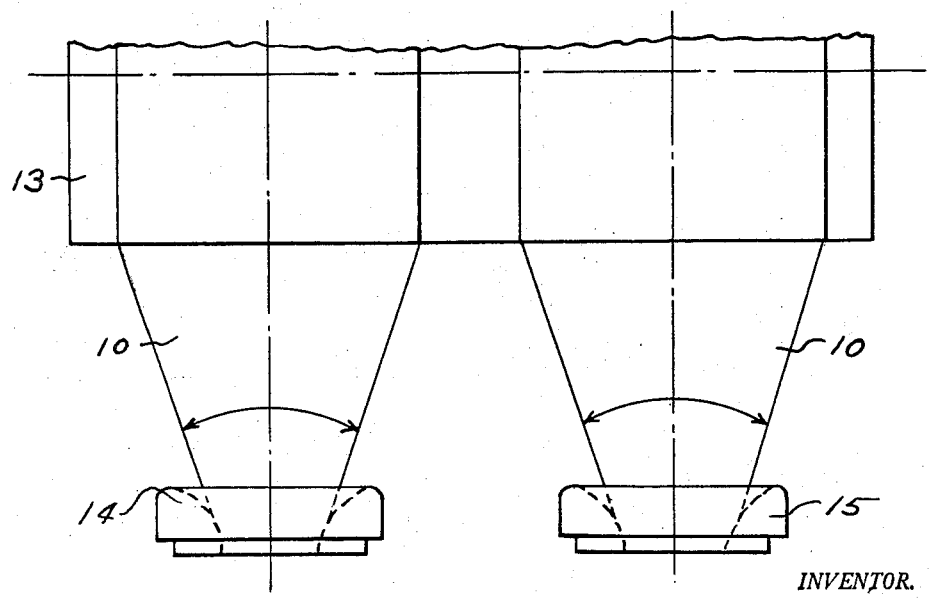

Fig. 14 is a schematic view illustrating the effect of varying the distance of the condensing trumpet from the drafting rolls or other equipment from which the trumpet receives the web-like sliver, and Fig. 15 is a schematic view showing the angles at which the edges of web-like slivers enter the condensing trumpets when a pair of trumpets are used for condensing the material from a single pair of cooperating drafting rolls.

While the present invention is subject to various modifications and of use in various sliver processing apparatus where it is desirable to condense or compact a web-like sliver, it is particularly useful for use with a gill box and coiling head for condensing the web-like sliver exiting from the drafting rolls of the gill box and for guiding the compacted sliver into the coiling head.

In the apparatus illustrated in Figs. 1 through 8 of the drawings, two web-like slivers, each designated by the reference numeral 10, are operated upon by a gill box 11 having drafting rolls 12, 13 at the exit end thereof. The web-like slivers 10 after passing through the drafting rolls 12, 13 are compacted by condensing trumpets 14, 15 prior to coiling in coiling heads 16, 17, the latter being of conventional construction and will not be described in detail. The coiling heads 16, 17 are offset from the axes of the condensing trumpets 14, 15 and according to the present invention, guideway or chute members 20, 21 are provided for guiding the compacted fibers from the condensing trumpets 14, 15, respectively, to the coiling heads 16, 17 respectively. The condensing trumpets and guideway members for each of the coiling heads 16, 17 are of the same construction and, therefore, only the trumpet and guideway members for the coiling head 16 will be described in detail.

The guideway member 20 supports the trumpet 14 which has an axial bore 18 for condensing the web-like sliver 10 received from the drafting rolls 12, 13; the bore 18 opens into a mouth portion 19 at the forward end of the trumpet and tapers from the mouth 19 to a section of smallest diameter adjacent to the exit end of the trumpet. The sliver 10 upon exiting from the bore 18 is received in an open channel or guideway 22 in the guideway member 20 and is guided thereby in its movement from the trumpet 14 to a receiving eye 23 in the coiling head 16. The guideway member 20 is curved or bowed in a horizontal plane inasmuch as the eye 23 on the centerline of the coiling head is offset from the axis of the trumpet 14. The open channel 22 in the guideway member 20 opens upwardly and to the right as viewed in Fig. 5 and has opposite sides 24, 25 joined by a semicircular portion 26 which forms the bottom of the channel 22. The center of the radius of curvature of the bottom of the channel lies in a plane which extends at an angle of approximately 45° with respect to the horizontal and which contains a line passing through a mid-point of the bottom portion of the channel. The channel constructed in this manner provides a secure guide for the compacted sliver traveling between the trumpet 14 and the eye 23 and prevents climbing of the channel by the sliver.

The trumpet 14 is mounted in an enlarged portion 27 at the right hand end of channel 22 and is held in the enlarged portion 27 by a spring clip 28. The enlarged portion 27 is similar in cross section to the channel and the upper ends of the side walls of the channel provide a pair of substantially flat, parallel surfaces 30, 31 lying in the same plane and to which the spring clip 28 is attached. The spring clip 28 is T-shaped in configuration with the cross of the T being fastened to the surfaces 30, 31 and the leg of the T being curled at its outer end to provide a spring detent 32 adapted to be received in an an annular groove 33 in the main body portion 34 in the trumpet 14. The spring clip 28 applies a bias against the trumpet 14 to securely hold the trumpet in the enlarged portion 27. The forward end of the trumpet 14 is provided with an annular shoulder 35 for limiting the inward movement of the trumpet 14 with respect to the enlarged portion 27 of the guideway member 20.

The position of the trumpet 14 with respect to the drafting rolls 12, 13 is adjustable. To this end the guideway member 20 is connected, adjacent to its exit end, to the coiling head 16 by spaced lugs 37 depending from the member 20 which lugs are pivotally secured to a bracket 38 on the coiling head 16 by a pivot pin 40 whose axis is perpendicular to the axis of trumpet 14. The guideway member 20 may be moved about the axis of the pivot pin 40 and selectively held in an adjusted position by a post 41 which is pivotally secured to the guideway member 20 at a point intermediate the ends thereof. The post 41 is connected to a boss 42 on the left hand side of the guideway member 20, as the member is viewed in Fig. 3, by a machine type screw 43 which passes through an enlarged opening 44 in the upper end of the post 41 and threads into the boss 42. The lower end of the post 41 is connected to the side of the coiling head 16 by means which permits vertical adjustment of the post with respect to the coiling head and comprises, in the illustrated embodiment, a stud 45 secured in the coiling head 16 and extending outwardly through a vertical slot 46 in the post 41. The vertical slot 46 permits vertical movement of the post 41 with respect to the stud 45. The post 41, however, may be secured in an adjusted position with respect to the coiling head 16 and the stud 45 by a clamp nut 47 which threads onto the end of the stud 45 and is adapted to engage post 41 on opposite sides of the slot 46 and to clamp the post against the coiling head 16.

By moving the post 41 vertically the guide 20 will be moved about the pivot 40 enabling the elevation of the trumpet 14 to be varied as well as the angle of inclination of the axis of the trumpet with respect to the direction of movement of the sliver 10. If the trumpet is inclined so that sliver entering the trump engages an upper portion of the mouth of the trumpet, the edges of the sliver will curl downwardly when being compacted and if inclined so that the entering sliver engages the lower portion of the mouth, the edges will curl upwardly when being compacted. The pivotal movement of the guideway member 20 also enables the member and the trumpet to be located in the best angular relationship to the member 20 to assure smooth transfer of the sliver from the trumpet 14 to the coiling head. It is also to be noted that pivotal movement of the guideway member 20 does not materially alter the relationship of the exit end of the channel 22 and the eye 23.

During the operation of the gill box and coiling head, the sliver 10 passing through the trumpet 14 may either bunch or break and, upon the occurrence of either condition, it is desirable to stop the operation of the coiling head and gill box. According to one feature of the present invention, a stop motion mechanism 49 responsive to the thickness of the sliver entering the trumpet 14 is provided to interrupt the operation of the gill box and coiling head in the event either one of the above mentioned conditions prevails.

The preferred form of the stop motion mechanism 49 comprises an L-shaped feeler bar 50 extending transversely of the sliver being condensed by trumpet 14 and adapted to rest on the sliver being condensed. The bar 50 is fastened to one end of a metallic arm 51 pivotally secured to a boss 52 on the left hand side of the guideway member 20, as the guideway member is viewed in Fig. 3, by a pivot pin 53 which threads into the boss 52. The pivotal support permits the arm 51 and the feeler bar 50 to drop downwardly, i.e., to the left as viewed in Fig. 7, when the sliver 10 is broken and to move upwardly i.e., to the right as viewed in Fig. 7 when the sliver bunches.

The rearward end of the arm 51 mounts a conductive contact support member 54 which carries a movable contact 55. The contact support member 54 is, in effect an extension of the arm 51 and the upward or downward movement of the arm 51 will move the contact 55 into engagement with either a contact 56 supported above the contact support member 54 or a contact 57 mounted below the contact support member 54. The contacts 56 and 57 are both mounted on different resilient fingers of a conductive copper plate 58 connected to a terminal 60 for providing external connection to the contacts 56, 57. The other connection to the stop motion mechanism may be a ground connection for the contact 55 through the contact support member 54, the arm 51, the pin 53 and the guideway member 20. It will be apparent from the foregoing description that the contact 55 is normally in a neutral or non-contacting position if the sliver being condensed is of the proper thickness and is moved upwardly to a position in engagement with the contact 56 if the sliver breaks or downwardly to a position in engagement with the contact 57 if the sliver bunches thereby providing a mechanism for controlling an electrical circuit for the driving motor of the apparatus in response to the thickness of the sliver at the mouth of the trumpet 14.

As mentioned above, the construction of trumpets 14, 15 as well as guideway members 20, 21 is substantially the same and it will be additionally understood that the guide 21 is provided with a stop motion mechanism similar in construction to the stop motion mechanism described for the guideway member 20 and the trumpet 14. The parts of the trumpet 15, the guideway member 21 and the stop motion mechanism 62 have been given the same number with a prime (') affixed thereto as the corresponding parts of the trumpet 14, the guideway member 20 and the stop mechanism 49, respectively.

The present invention also contemplates the provision of a trumpet and guide for condensing a single web-like sliver received from drafting rolls such as the drafting rolls of a gill box. Figures 9 through 13 illustrate a single coiling head 63 for use with the gill box 11 and having a trumpet 64 with an axial bore 64ª therein adapted to condense the web-like sliver received from the drafting rolls 12, 13 and a guideway member 65 having an open channel 66 for guiding the compacted sliver from the trumpet 64 to an inlet eye 67 of the coiling head 63. The channel 66 opens upwardly and is symmetrical about a vertical plane. The trumpet 64 is mounted in the forward end of the guideway member 65 and is received in an enlarged portion 68 of the channel 66. The trumpet 64 is held in the enlarged portion 68 by a T-shaped spring clip 70 supported between the parallel upper edges 71 of the side walls of the channel 66. The spring clip 70 is similar in construction to the spring clip 28 of the first described embodiment and the leg of the T is curled at its outer end to provide a detent 72 adapted to be received in an annular groove 73 in the main body portion 74 of the trumpet 64. The trumpet 64, the main body portion 74, and the annular groove 73 correspond to the trumpet 14 and its main body portion 34 and annular groove 33, respectively, and, therefore, will not be described in detail. A shoulder 75, however, similar to the shoulder 35 is provided adjacent the forward end or mouth portion of the trumpet 64 to limit the inward movement of the trumpet with respect to the guideway member 65.

The guideway member 65 is supported on the coiling head 63 by means which permits generally vertical movement and generally horizontal movement of the guideway member 65 and the trumpet 64 and also movement about a horizontal axis parallel to the drafting rolls and passing through the rearward portion of the guide. To this end, the guideway member 65 is provided with a trunnion 77 which extends horizontally from a boss 78 on the right hand side of the guideway member 65 as viewed in Figure 10, which trunnion engages the upper inclined edge 80 of a vertical support plate 81. The edge 80 is inclined with respect to a horizontal plane to permit the elevation of the rearward portion of the guideway member 65 to be adjusted by moving the trunnion 77 along the edge 80.

The forward part of the guideway member 65 is supported by an L-shaped arm 82 having a leg 83 secured to the vertical support plate 81 and a leg 84 secured to the guideway member 65. The leg 83 of arm 82 is secured to the support plate 81 by a pair of bolts 85 which pass through the support plate 81 and operate in a slot 86 in the leg 83. The outer ends of the bolts 85 are threaded and adapted to receive clamp nuts 87 for clamping the leg 83 against the vertical support plate 81 and preventing relative movement of the L-shaped arm 82 with respect to the plate. The L-shaped arm 82, however, may be adjusted lengthwise of its leg 83 with respect to the vertical plate 81 by loosening the clamp nuts 87 and shifting the leg 83.

The leg 84 of the arm 82 extends in a substantially vertical direction and is connected to the guideway member 65 by a stud 88 which operates in a vertically elongated slot 89 in the leg 84, which slot permits adjustment of the vertical position of the forward portion of the trumpet 64. The stud 88 is adapted to have a nut 90 threaded onto its outer end to clamp the leg 84 between the nut and the guideway member 65 to prevent relative movement therebetween. The above described support for the guideway member 65 and trumpet 64 permits the trumpet to be moved about the axis of trunnion 77 to incline the axis of the trumpet or the trumpet to be adjusted along either vertical or horizontal lines, the horizontal line of movement being in a direction parallel to the axis of the trumpet.

The guideway member 65 and trumpet 64 are also provided with a stop motion mechanism 91 similar in construction to the stop motion mechanism 49 associated with the trumpet 14 and the guideway member 20. Inasmuch as the construction and the manner of operation of the stop motion mechanism 91 is the same as the first described stop motion mechanism the description will not be repeated but suffice it to say that when the sliver being condensed by the trumpet 64 either breaks or bunches, the movement of the sliver is interrupted by the change in position of a feeler bar 92 which causes the stopping of the mechanism.

The guide member 65 and trumpet 64 for the single coiling head 63 is constructed so as to be movable toward and away from the drafting rolls 12, 13 for reasons which will be apparent from an examination of Fig. 14. In condensing a web-like sliver, it is desirable that the angle defined by the outside edges of the sliver being condensed and the axis of the trumpet be less than a critical angle which varies depending upon a fiber being treated. If a wide sliver is being processed the condensing trumpet 64 must be located at a distance farther from the drafting rolls 12, 13 than would be necessary if a relatively narrow web-like sliver were being processed. The construction of the support means for the trumpet 64 and the guide member 65 permits the necessary adjustment to be made to compensate for various widths of slivers and yet maintain a minimum distance between the trumpet 64 and the drafting rolls 12, 13.

As illustrated in Fig. 15, the critical angle is seldom exceeded when two web-like slivers are being simultaneously processed and, therefore, no provision is made in the apparatus illustrated in Figs. 1 through 8 for longitudinal adjustment of the condensing trumpets 14, 15.

It will be apparent from the foregoing description that the present invention provides a new and improved apparatus for condensing a web-like sliver and for guiding the condensed sliver to a coiler head which coils the sliver into a sliver can or other mechanism for performing an operation on the condensed sliver. The manner in which the sliver is condensed may be readily controlled and uniform drafting produced regardless of the width of the web or whether the sliver contains long or short fibers.

The present invention also provides a condensing trumpet and guide positioned intermediate a gill box and coiling head and having in combination therewith a stop motion mechanism responsive to the thickness of the sliver entering the mouth of the condensing trumpet and adapted to interrupt the motion of the sliver by stopping the machine when the sliver either breaks or bunches.

While the preferred embodiments of the present invention have been described in considerable detail, it is to be understood that it is my intention to hereby cover all modifications thereof which fall within the practice of those skilled in the art and the scope of the appended claims.

Having thus described my invention, I claim:

1. In a sliver processing apparatus, a trumpet for condensing a web-like sliver, a member including means for guiding the movement of the condensed sliver exiting from said trumpet, means connecting said trumpet to said member at the forward end thereof, means supporting said member for limited adjustment about an axis parallel to and extending transversely of the web-like sliver being condensed, and means for securing said member in a selected angular position with respect to the axis.

2. In a sliver processing apparatus, a trumpet for condensing a web-like sliver, a member having a channel therein for guiding the movement of the condensed sliver exiting from said trumpet, spring means detachably connecting said trumpet to said member at the forward end thereof, means supporting said member for rotational movement about an axis parallel to and extending in a direction transversely of the web-like sliver being condensed, and means for preventing rotation of said member about said axis.

3. In a sliver processing apparatus, a trumpet for condensing a web-like sliver, a member having a curved channel therein for guiding the movement of the condensed sliver exiting from said trumpet to a point offset from the axis of said trumpet, means connecting said trumpet to said member adjacent to the forward end of said channel, means supporting said member for adjusting movement about an axis parallel to and extending transversely of the web-like sliver being condensed, and means for fixing said member in a selected angular position with respect to the axis.

4. In a sliver processing apparatus, a trumpet for condensing a web-like sliver, a member having a curved channel therein for guiding the movement of the condensed sliver exiting from said trumpet to a point offset from the axis of said trumpet, spring means detachably connecting said trumpet to said member at the forward end thereof, means supporting said member for rotational movement about an axis parallel to and extending in a direction transversely of the web-like sliver being condensed, and means for preventing rotation of said member about said axis.

5. In a sliver processing apparatus, a trumpet for condensing a web-like sliver, a member having an open channel therein for receiving and guiding the movement of the condensed sliver exiting from said trumpet, said channel opening in a generally upward direction and having one end portion adapted to receive said trumpet, and means for detachably securing said trumpet in said one end portion of said channel comprising a T-shaped spring member supported between the sides of said channel and having a portion forming a spring detent, said trumpet having a recess therein for receiving said detent.

6. In a sliver processing apparatus, a pair of cooperating drafting rolls, a trumpet for condensing the web-like sliver exiting from said rolls, a member having means for guiding the movement of the condensed sliver exiting from said trumpet, means connecting said trumpet to said member adjacent the forward end thereof, means connected to a portion of said member adjacent to the rearward end thereof for supporting said member for rotation about an axis substantially parallel to and extending in a direction transversely of the web-like sliver being condensed, and means supporting the forward portion of said member for adjustment along a line substantially perpendicular to the plane of the web-like sliver.

7. In a sliver processing apparatus, a frame, a pair of cooperating drafting rolls, a trumpet for condensing the web-like sliver exiting from said rolls, a member including means for guiding the movement of the condensed sliver exiting from said trumpet, means connecting said trumpet to said member adjacent the forward end thereof, means for supporting the rearward end of said member comprising a trunnion extending in a horizontal direction substantially parallel to said rolls and to said frame including a support plate extending generally perpendicular to said rolls and having an inclined upper edge engaged by said trunnion, said edge being inclined so that movement of said trunnion therealong will move said member vertically, means for supporting the forward portion of said member for adjustment along a substantially vertical line, and means for connecting the last said means to said frame and permitting adjustment thereof with respect to said support plate in a direction toward and away from said drafting rolls.

8. In a sliver processing apparatus, a frame, a pair of cooperating drafting rolls, a trumpet for condensing the web-like sliver exiting from said rolls, a member having a curved channel therein for guiding the movement of the condensed sliver exiting from said trumpet to a point offset from the axis of said trumpet, means connecting said trumpet to said member adjacent the entrance end of said channel, means adjacent to the exit end of said channel for supporting said member comprising a lug depending from said member and a pin extending generally parallel to said drafting rolls for connecting said lug to said frame and supporting said member for rotation about the axis of said pin, a post connected to said member intermediate said lug and said trumpet, and means connecting said post to said frame for vertical adjustment with respect to said frame.

9. In a sliver processing apparatus, a frame, a pair of cooperating drafting rolls, a trumpet having a tapered bore for condensing the web-like sliver exiting from said rolls, said trumpet having a recess in its outer wall, a member having a curved channel therein for guiding the movement of the condensed sliver exiting from said trumpet to a point offset from the axis of said trumpet, a spring detent supported by said member and adapted to be received in said recess for connecting said trumpet to said member adjacent the entrance end of said channel, with the bore of said trumpet aligned with the said channel, means adjacent to the exit end of said channel for supporting said member comprising a lug depending from said member and a pin extending generally parallel to said drafting rolls for connecting said lug to said frame and supporting said member for rotation about the axis of said pin, a post connected to said member intermediate said lug and said trumpet, and means connecting said post to said frame for vertical adjustment with respect to said frame.

10. In a sliver processing apparatus, a gill box having a pair of drafting rolls at its exit end, a coiling head spaced from said drafting rolls, a condensing trumpet for condensing the web-like sliver exiting from said rolls positioned intermediate said drafting rolls and said coiling head, a member supporting said trumpet and having a channel therein for guiding the movement of the condensed sliver from said trumpet to said coiling head, a feeler bar pivotally supported by said member and adapted to ride against the sliver entering said trumpet, said feeler bar being moved in one direction by bunching of the sliver and in the opposite direction by the breaking of the sliver, and switch means connected in the circuit for controlling the operation of the machine and operated in response to the movement of said feeler bar upon the breaking or bunching of said sliver to interrupt the movement of the sliver.

11. In a sliver processing apparatus, a gill box having a pair of drafting rolls at its exit end, a coiling head spaced from said drafting rolls, a condensing trumpet for condensing the web-like sliver exiting from said rolls positioned intermediate said drafting rolls and said coiling head, a member supporting said trumpet and having a channel therein for guiding the movement of the condensed sliver from said trumpet to said coiling head, means supporting said member for movement about an axis parallel to said drafting rolls and adjacent to the end of said channel remote from said trumpet, a feeler bar pivotally supported by said member and adapted to ride against the sliver entering said trumpet, said feeler bar being moved in one direction by bunching of the sliver and in the opposite direction by the breaking of the sliver, and switch means connected in an electrical circuit for stopping the machine and operated in response to the movement of said feeler bar upon the breaking or bunching of said sliver to interrupt the movement of the sliver.

12. In a sliver processing apparatus, a gill box having a pair of cooperating drafting rolls at the exit end thereof, a coiling head, a condensing trumpet intermediate said drafting roll and said coiling head, the axis of said trumpet being positioned to one side of said coiling head, a member supporting said trumpet and having a curved channel therein for guiding the movement of the condensed sliver from said trumpet to said coiling head, means pivotally supporting the end portion of said member adjacent to said coiling head for movement about an axis parallel to said drafting rolls, means for securing said member in an adjusted angular position about said axis, and stop motion mechanism carried by said member and responsive to the thickness of the sliver entering said trumpet for controlling the movement of said sliver through the processing apparatus.

References Cited in the file of this patent

UNITED STATES PATENTS

| | | |
|---|---|---|
| 128,999 | Brooks et al. | July 16, 1872 |
| 1,848,667 | Scott | Mar. 8, 1932 |
| 2,206,232 | Martin | July 2, 1940 |
| 2,679,073 | Scott | May 25, 1954 |
| 2,680,266 | Kershaw | June 8, 1954 |
| 2,700,187 | McKenna et al. | Jan. 25, 1955 |